No. 631,844. Patented Aug. 29, 1899.
T. BRENNAN, Jr.
SEEDING MACHINE.
(Application filed May 25, 1898.)

(No Model.) 4 Sheets—Sheet 1.

Witnesses.
Clarence E. Mehlhope
Odward J. Haat.

Inventor.
Thomas Brennan, Jr.,
By Acker Stein,
Attorney.

THE NORRIS PETERS CO., PHOTO-LITHO., WASHINGTON, D. C.

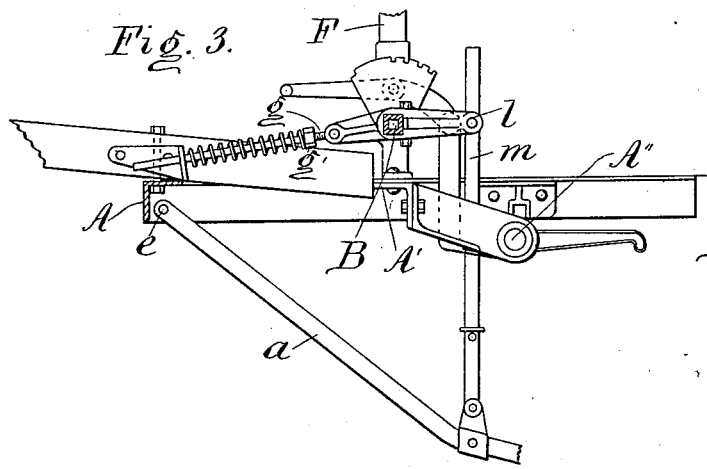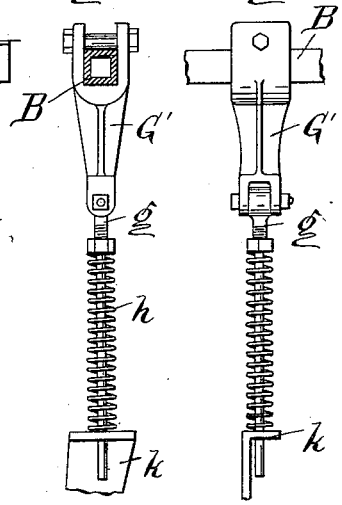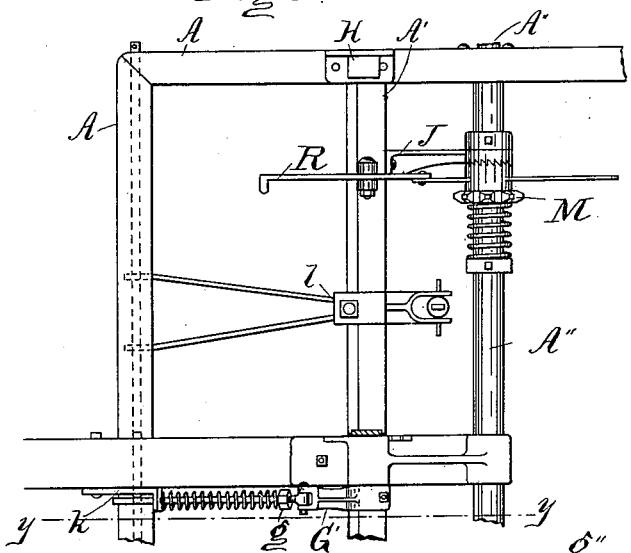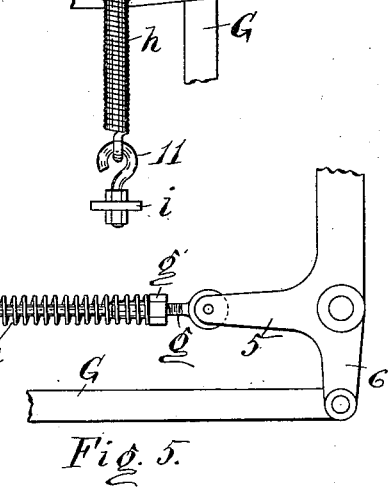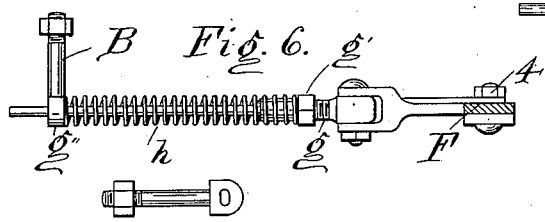

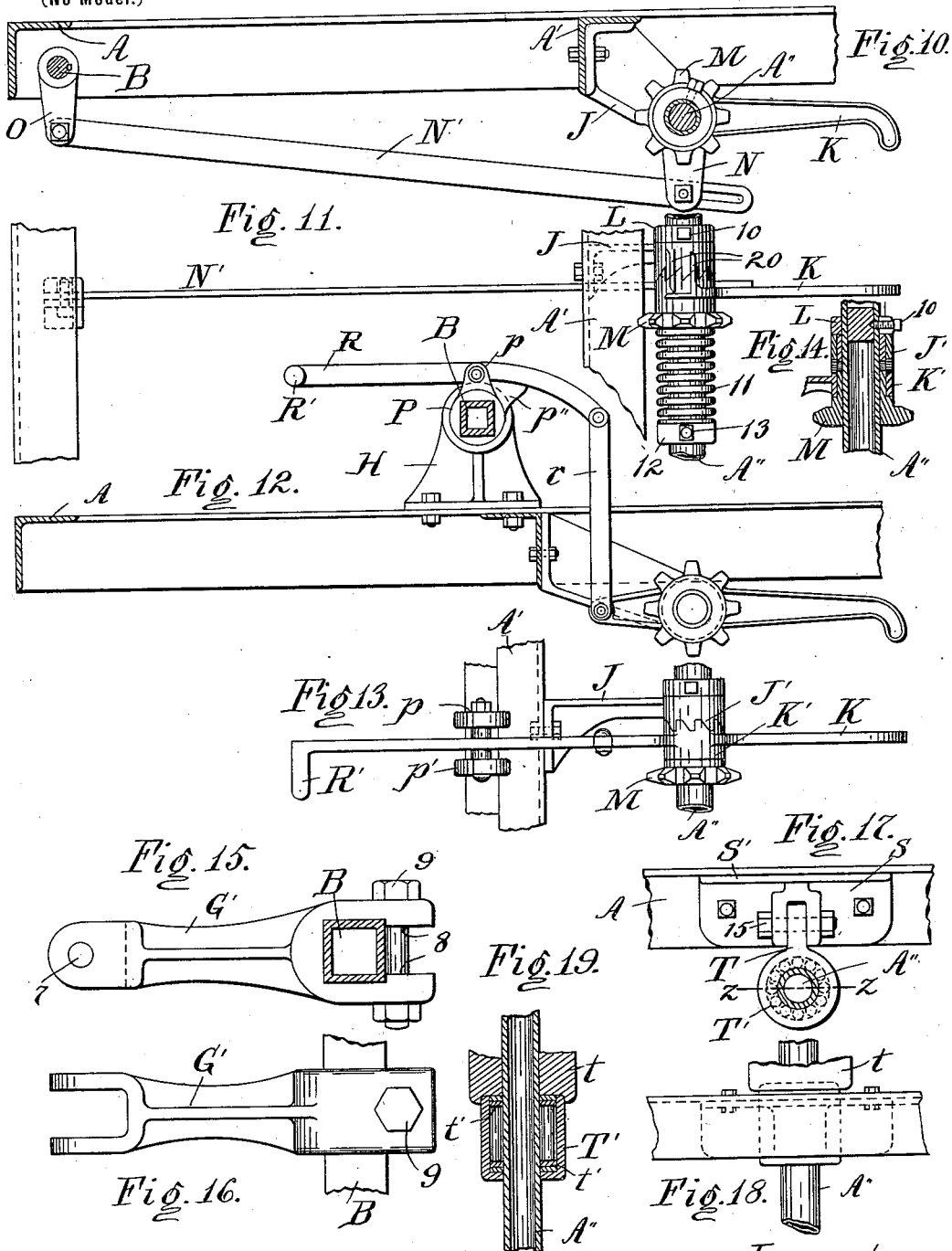

No. 631,844. Patented Aug. 29, 1899.
T. BRENNAN, Jr.
SEEDING MACHINE.
(Application filed May 25, 1898.)
(No Model.) 4 Sheets—Sheet 4.
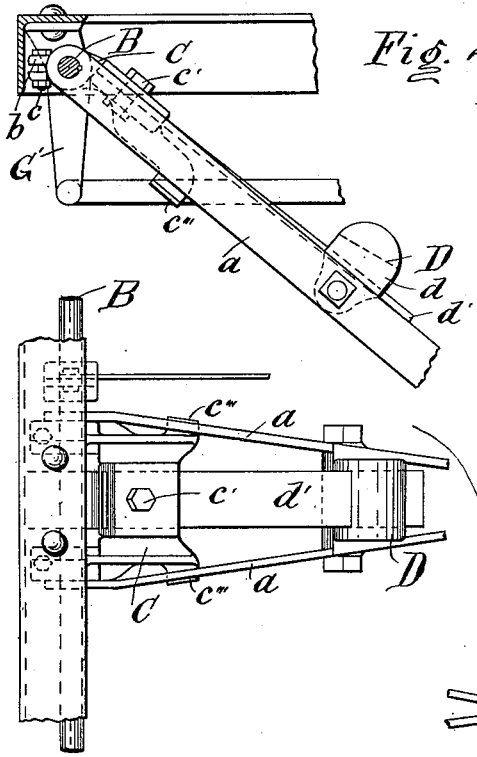
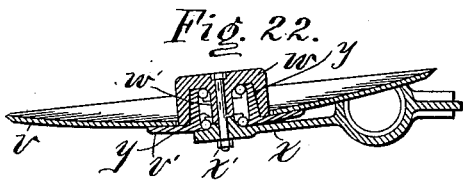
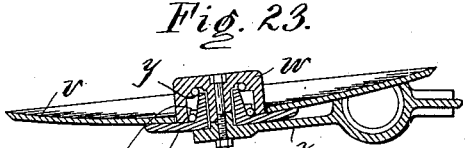
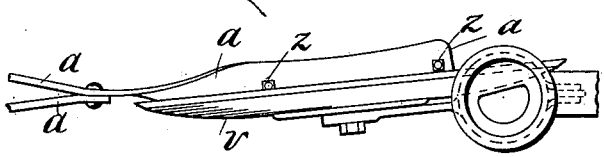
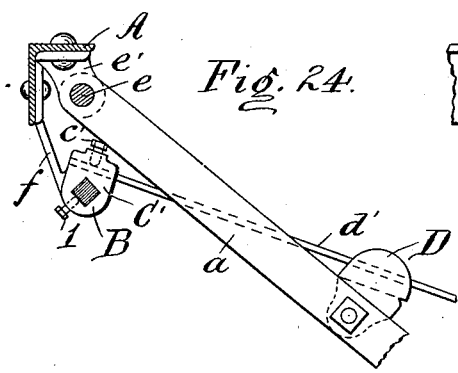
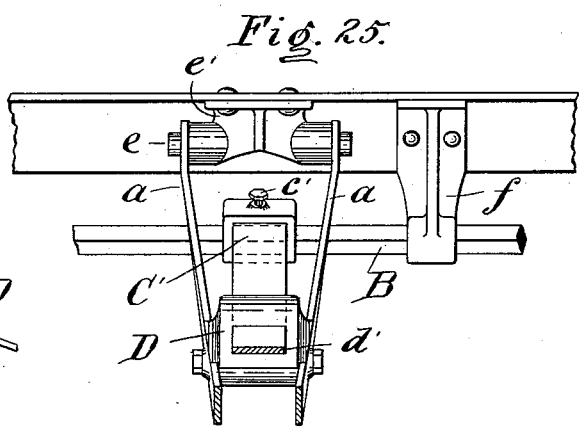
Witnesses.
Clarence E. Mehlhope
Edward J. Haat.
Inventor.
Thomas Brennan, Jr.,
By Arthur Stem,
Attorney.
THE NORRIS PETERS CO., PHOTO-LITHO., WASHINGTON, D. C.

UNITED STATES PATENT OFFICE.

THOMAS BRENNAN, JR., OF LOUISVILLE, KENTUCKY.

SEEDING-MACHINE.

SPECIFICATION forming part of Letters Patent No. 631,844, dated August 29, 1899.

Application filed May 25, 1898. Serial No. 681,738. (No model.)

*To all whom it may concern:*

Be it known that I, THOMAS BRENNAN, Jr., a citizen of the United States, and a resident of Louisville, in the county of Jefferson and State of Kentucky, have invented certain new and useful Improvements in Seeding-Machines, of which the following is a full, clear, and exact description, reference being had to the accompanying drawings, forming part of this specification.

My invention consists in certain new and useful improvements in seeding-machines, some of which are applicable to either the runner or shoe drill or the disk drill, and relates to the novel construction and arrangement of the lifting or drag bar controlling device and the manner of mounting the drag-bars, the feed-disengaging mechanism, the construction and arrangement of the furrow-openers or disks, and the application of roller or ball bearings to the disks and the main axle of the seeding-machine, all of which will be more fully hereinafter set forth and described.

Figure 1:
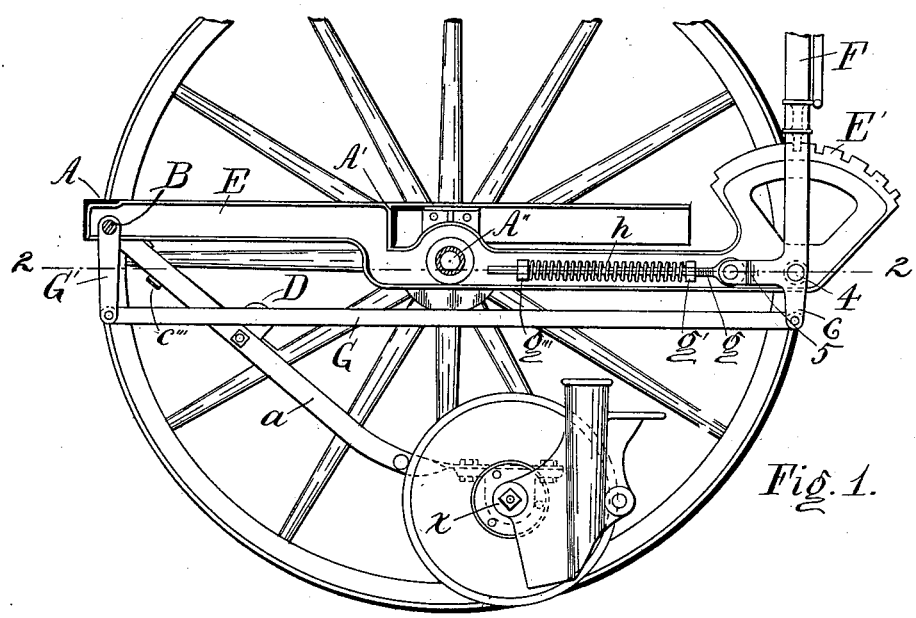
Figure 2:
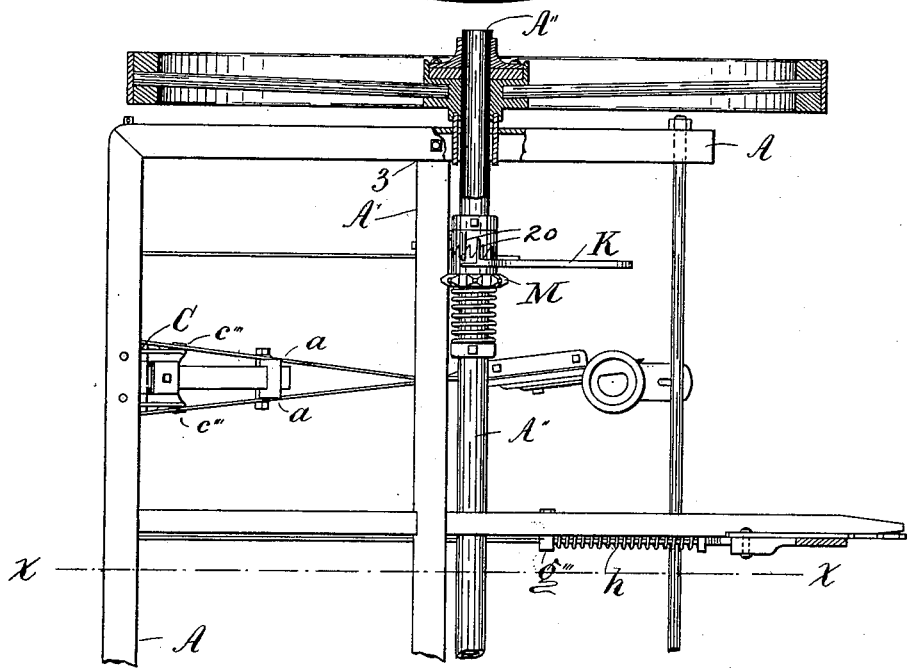

In the drawings, Figure 1 is a cross-section of one form of my improved drill, taken on the line X X of Fig. 2. Fig. 2 is a horizontal sectional view taken on the lines 2 2 of Fig. 1. Fig. 3 is a cross-sectional view taken on the lines $y$ $y$ of Fig. 4, showing modified forms of my lifting mechanism and balance-spring and disengaging-clutch. Fig. 4 is a top plan view of Fig. 3. Fig. 5 is a detail view of the lifting-lever in section and balance-spring shown in Fig. 1. Fig. 6 is a top view of Fig. 5. Fig. 7 is a detail view of the balance-spring and its connections as shown in Figs. 3 and 4. Fig. 8 is a top view of Fig. 7. Fig. 9 is a side view of a modified form of balance-spring and method of attachment. Fig. 10 is a side view in detail of the disengaging-clutch shown in Fig. 2. Fig. 11 is a top plan view of Fig. 10. Fig. 12 is a side elevation in detail of a modified form of disengaging-clutch as shown in Figs. 3 and 4. Fig. 13 is a top plan view of Fig. 12. Fig. 14 is a horizontal cross-section of the disengaging-clutch. Fig. 15 is a side view of one of the pressure-arms, and Fig. 16 is a top view of same. Fig. 17 is a side elevation in cross-section of one of the boxes or journals for the main axle and its bearings, and Fig. 18 is a top view of same. Fig. 19 is a horizontal section of the journal, taken on the lines $z$ $z$ of Fig. 17, showing its relation to the axle and wheel-hub. Fig. 20 is a side view in detail of my improved method of applying spring-pressure to the drag-bars and mechanism for rocking same. Fig. 21 is a top plan view of same and showing its manner of attachment to the disks. Fig. 22 is a horizontal cross-section of one of the disks, showing one form of improved bearing therefor. Fig. 23 is a similar view of another form of bearing or mounting. Fig. 24 is a similar view of still another form of mounting the disks. Fig. 25 is a side view in detail of a modified form of the construction shown in Fig. 20, and Fig. 26 is a top plan view of same.

Like letters and numerals of reference indicate identical parts in all the figures.

A is the frame, of the usual angle-steel construction, extending across the front and along the two sides of the machine and having cross braces and rods extending from side to side to reinforce the frame.

I have illustrated in Figs. 1 and 2 what may be termed a "rear lift," which construction I shall proceed to describe first.

Extending from side to side at the front end of the frame is a rod or rocker-shaft B, which may be loosely supported in any convenient manner. This rocker-shaft supports the drag-bars $a$ $a$, which have suitable openings to permit their being slipped on the rocker-shaft B. Placed between the two arms $a$ $a$ of the drag-bar is a drag-bar head C, which is preferably of the peculiar construction shown in Figs. 1, 2, 20, and 21 and has at each side a pair of extensions or forks $b$ $b$, which forks are provided with a bolt-hole to permit the introduction of a bolt $c$, whereby the forks or extensions $b$ $b$ $b$ $b$ are drawn together, thereby securely clamping it to the rocker-shaft B. The lower end of this drag-bar head C has side wings $c'''$ $c'''$, which pass underneath the drag-bar arms $a$ $a$, as clearly seen in Figs. 20 and 21, their office being the raising or lifting of the drag-bars when the shaft B is rocked, which rocks the drag-bar head C, which is securely clamped thereto. Placed at a suitable point between the drag-bars is a spacing-block D, which is held in place by a bolt passing through said block and the drag-arms $a$ $a$, as shown in Figs. 1, 20, and 21. This block D is provided with a slot or opening d, Fig. 20, through which the flat spring d' passes, this spring d' at its other end passing into a slotway in the drag-bar head C, where it is held by a bolt c'. It will thus be seen that when the rocker-shaft B, on which the drag-bars are loosely hung, is rocked the drag-bar head C, being securely clamped thereto, is moved thereby and the desired spring-pressure applied to the drag-bars by the spring d' pressing down in the block D or the drag-bars raised by the extensions c''' c''' on the drag-bar head C, depending upon the direction in which the shaft B is rocked. By this means the drag-bars are permitted to have vertical play for any undulations in the surface of the soil. In Fig. 25 I show another method of accomplishing the same result, in which the drag-bars a are loosely hung on a supporting-rod e, which is held in place and supported by a bracket e', which is bolted to the main frame A in any suitable manner. Attached to the frame A is a casting or bracket f, which extends down and fits over and loosely supports the rocker-shaft B. Fitting on this rocker-shaft B are rocker-heads C', which are securely held in position on the rocker-shaft in any suitable manner, though I have shown a thumb screw or bolt 1. This rocker-head C' has a slotway through which the flat spring d' passes, where it is held by a screw c'. With this construction the slotway in the spacing-block D is placed at a different angle from that shown in Figs. 20 and 21. Fitting over the shaft B, (or shaft e if the construction shown in Fig. 25 is used,) Fig. 1, is a plate or bar E, which extends back to the rear end of the machine, being curved downward at its center to pass below the cross-frame A', which passes from one side to the other and is bolted or riveted to the main frame A, as seen at 3, Fig. 2. The plate or bar E is also provided with an opening sufficiently large to permit the axle A'' to pass through. The rear end of this plate or bar E has integrally formed therewith the notched arch E'. Pivotally connected to said arch at 4 is a lifting-lever F, having a front and lower extension 5 and 6. Loosely bolted to said front extension 5 is a rod g, which for purposes of economy and lightness I have made of smaller diameter at its free end, as can be clearly seen in Figs. 5 and 6, thus permitting the swelled or thicker portion of the rod to be threaded in a machine without necessitating the threading of the entire rod. This rod g at its swelled end is screw-threaded to receive a tension-nut g'. The other end of this rod g is supported by a collar g'', through which the rod passes. This collar g'' has a screw-threaded shank which passes through an opening in the plate or bar E, where it is securely held in place by a nut. Encircling the rod g and between the collar g'' and tension-nut g' is a compression-spring h, the tension of the spring being regulated by the tension-nut g', which can be screwed back and forth on the screw-threaded portion of the rod g.

Pivotally connected to the lower extension 6 of the lever F is a connecting-bar G, which is also pivotally connected at its other end to the rocker-arm G'. This rocker-arm is preferably made in the bifurcated manner shown in Figs. 15 and 16, the connecting-bar G being pivoted at the point 7, Figs. 16 and 17. On the bifurcated ends which fit around the rocker-shaft are formed small lips or lugs 8 8, thereby producing a bearing-surface against the rocker-shaft. These bifurcations are provided with a bolt or screw hole, so that after the rocker-shaft B has been inserted between the bifurcations of the pressure-arm G' a bolt 9 is passed through the holes in the bifurcations and these bifurcations drawn together, thus securely grasping the rocker-shaft. It will thus be seen that by throwing the lever F, Fig. 1, forward, the lower portion 6 consequently moving backward, the connecting-bar G is pulled back, and it in turn pulls the pressure or rocker arm G', which is securely fastened to the rocker-shaft, with it, thereby rocking the shaft B, to which the drag-bar head C is securely clamped, and lifting the drag-bars from the ground. The lever F is of course provided with the usual pawl, which may be dropped in any of the notches of the arch E' that it is desired, thus holding the drag-bars with their disks or runners in the desired position.

It will be readily understood that the raising and lowering of a number of drag-bars with disks or runners is a considerable strain on the operator, and it is to reduce this strain and assist the operator that I provide the lifting device above described with a compression-spring. As shown in Fig. 1, when the lever F is in a perpendicular position the point of connection of the extension 5 and the rod g and the pivotal point or fulcrum 4 of the lever F are on a "dead-center," so that the stored tension in the spring h is exerted directly against the fulcrum 4 of the lever. Moving the lever F, either way, from a perpendicular position, will of course move the point of connection of the rod g and the extension 5 past the dead-center, and the stored tension of the balance-spring h will be permitted to exert itself against the extension 5 of the lever, thereby greatly assisting the operator in either raising or lowering the drag-bars, as the case may be.

In addition to the assistance received by reason of the stored energy of the balance-spring h the tension or expansion of the pressure-spring d' is also had, the pressure-spring d' immediately expanding as the pawl is withdrawn from the notch in the arch and the lever thrown forward and again compressing the balance-spring h. It will thus be readily understood that with the balance-spring and the pressure-spring of each drag-bar the burden of raising the drag-bars is greatly diminished, and when the drag-bars are lowered the balance-spring compresses as it approaches the dead-center, thus giving a cushioning effect, reducing the jar which heretofore was a consequent result.

Of course it will be readily understood that in place of the construction of lever described and shown in Figs. 1, 5, and 6 other modified constructions may be used, one form being shown in Fig. 9, where the extension 5 is on the opposite side of the lever and provided with a lip 10, through which one end of a compactly-coiled spring $h$ is hooked or fastened, while the other end of this spring hooks over a hook 11, which passes through and is securely held to an extension $i$ on the plate E by nuts or in any convenient manner. This spring $h$, being held in an expanded condition, tends constantly to draw or pull on the extension 5 of the lever F.

I have heretofore described what is termed "rear lift," being the constructions shown in Figs. 1, 2, 5, and 6. In Figs. 3 and 4 the application of a "front lift" is illustrated, in which B is the rocker-shaft. Attached to the rocker-shaft, as before described, is the rocker-arm G', which has pivotally connected to it the rod $g$, about which is fitted the compression or balance spring $h$, the rod $g$ passing through a right-angled plate $k$, which is bolted to the tongue of the drill, as seen in Fig. 3, and against which plate the one end of the spring presses, while the other end comes against the tension-nut $g'$. In this construction it will be noticed that the spring-pressure is directly applied to the rocker-shaft B and, as shown in Fig. 3, is on a dead-center, so that any rocking of the shaft B by the lever F will move the pressure-arm G' and consequently the tension stored in the balance-spring $h$ will be permitted to relax, and thus assist in the rocking of the shaft in either direction. Securely attached to the rocker-shaft in any suitable manner are pressure-arms $l$, preferably of the construction used for the rocking arm G' (shown in Figs. 15 and 16) and removably clamped by the bolt, thus permitting of the removal of any one of the pressure-arms $l$, should it be desired, without the necessity of removing the entire rocker-shaft; but with my construction of pressure-arms they are separably removable without the necessity of taking the entire machine apart. They are also pivotally connected to the lifting-rods $m$, which rods are attached to the drag-bars $a$ in any suitably manner. In this construction the usual form of coiled spring may be used to put the drag-bars under spring-pressure, in which case the coiled spring would be placed on the lift-rod $m$. The rocker-shaft in this construction is supported by standards or supports H, Fig. 12 and 13, which are bolted to the cross-frame A'. With this construction the strain brought about by the dropping of the drag-bars is taken off of the frame and entirely thrown on the tongue of the drill.

In Figs. 10 and 11 I have illustrated the disengaging-clutch as applied to the construction illustrated in Figs. 1 and 2. J is an arm which is bolted to the cross-frame A'. This arm J has integrally formed on the other end a notched or toothed collar J'. K is a hand lever or arm which has an integrally-formed collar K' thereon, which collar is notched or toothed and meshes with the notched collar J'. Securely fastened to the main axle A" by screw or bolt 10 adjacent to the arm or bracket J is an elongated collar or sleeve L, the ring or enlarged portion of which fits up against the collar J', while its smaller or integrally-formed sleeve portion fits within the collar J', as shown in Fig. 14. Adjacent to the collar K' is a sprocket-wheel N, which has an integrally-formed sleeve, which fits within the collar K'. (See Fig. 14.) The two elongated sleeves just described are notched or toothed and mesh with each other, forming the usual sprocket-clutch mechanism, the teeth on the sleeves, however, being made much smaller than those on the collars J' and K'. Fitted on the axle A" and butting against the sprocket-wheel M is a coiled spring 11, the tension of which spring is regulated by the tension-collar 12, which is secured at the desired point on the axle A" by a screw 13, which comes in contact with the surface of the axle and securely holds it in place. The tendency of this spring 11 is to hold the collars and clutch in mesh, which it accomplishes by pressing against the sprocket-clutch M, keeping it in mesh with the stationary clutch L, and by reason of the sprocket-clutch M being held snugly against the collar K' the collar K' is held in mesh with the stationary collar J'. It will thus be seen that when the axle A" is revolved the toothed sleeve or clutch L, which is securely fastened to the axle and which is loosely fitted within the collar J', will revolve with the axle, and this sleeve in turn will revolve the sleeved sprocket-wheel M, which is also loosely fitted within collar K', which is also toothed and is held in mesh by the spring 11, which is kept under strong tension by the tension-collar 12, which revolves with the axle. Of course it is understood that a sprocket-chain runs from the sprocket-clutch M to a sprocket-wheel on the feed-shaft beneath the hopper-box in the well-known manner. Integrally formed on the loose collar K' is an arm N, extending downwardly and has pivotal connection with a connecting-bar N', which extends forward and is pivoted to a rocker-arm O, which fits over and is securely fastened to the rocker-shaft B. If it is desired to disengage the driving-clutch and throw the sprocket-clutch out of mesh with the non-lateral-moving portion of the clutch L, and thus stop the operation of the feeding mechanism on the feed-shaft, it may be done in two ways in the device heretofore described, either by pulling up the hand-lever K, which is integrally formed on the collar K', thus sliding the teeth on the collar K' over the teeth on the stationary collar J', bringing the teeth point to point. These teeth being larger than the teeth on the clutch L M throws them out of mesh, thus permitting the portion L of the clutch which is securely fastened to the axle, to revolve independent of the sprocket-clutch M, which sprocket-wheel is held snugly against the non-revolving collar K' by the spring 11, or the driving-clutch may be disengaged by the rocking of the rocker-shaft B, which in turn will rock the arm O, which is securely fastened thereto, and this rocker-arm will push the connecting-bar N', which will push the arm N, which is integrally formed on the collar K', backward, thus throwing the large teeth on the collars K' and J' on "edge" and the clutch out of mesh. To prevent the overrunning of the teeth and their slipping beyond their points, I provide two lugs 20 20 at proper distances apart—one on the loose collar K' and the other on the stationary collar J'—the ends of these lugs slightly overlapping the adjacent collar, so that when the teeth are thrown on edge these lugs come in contact and being either integrally formed thereon or properly secured to the collars preventing the further forward movement of the collar K'. By turning the rocker-shaft B in the opposite direction or by depressing the hand-lever K the collars and clutch will be thrown into mesh again by the action of the spring 11. It will thus be seen that the operator may disengage the driving-clutch by the hand-lever K without necessitating the raising of the drag-bars, thus permitting him to harrow any portion of the field where he does not wish to sow the grain.

The construction of clutch heretofore described is designed to be used in the construction shown in Figs. 1 and 2 on what are termed rear lifts.

In Figs. 12 and 13 I have shown my driving-clutch as applied to a "front lift"—the construction shown in Figs. 3 and 4. Fitted on the rocker-shaft B is a collar P, which collar has bifurcations $p$ $p$, between which the foot-lever R passes and is pivoted thereto. Pivoted to the foot-lever R is a connecting-arm $r$, which extends down and is connected at its other end to the arm N, integrally formed on the loose collar K', but in this construction formed at a different angle from that shown in Figs. 10 and 11. The foot-lever R has a foot-piece R' at its free end. By pressing the foot on this foot-piece R' the lever R will be rocked on the pivotal connection at $p$ $p$, drawing the connecting-rod $r$ up, which in turn revolves the loose collar K', throwing its teeth up on the teeth of the collar J', as before described, disconnecting the driving mechanism. The collar P has its opening of a shape to conform to the shape of the rocker-shaft B and moves or rocks with it. Integrally formed on the collar P is a projecting lug $p''$, which bears against the lower surface of the lever R, so that when the rocker-shaft B is rocked and the drag-bars raised the collar P, with the projecting lug $p''$, is also rocked therewith, and the lug $p''$ presses against the foot-lever R, pushing it upward, drawing the bar $r$ with it and disengaging the clutch. Thus it will be seen that there are three ways in which the operator may disengage the driving-clutch—namely, either by rocking the shaft B when also desiring to raise the drag-bars, by pressing the foot on the lever R, or by depressing the hand-lever K, which would be the method used when the operator is walking back of the machine.

As above described and as is true in a majority of the drills constructed, the power for operating the feed devices is obtained by the revolving of the main axle, to which the carrying-wheels are stationarily attached. It has been common to have the axle mounted or supported by hangers or brackets attached to the main frame, and one part of my invention is the application of a new form of bracket or hanger which is devised for the application of roller or ball bearings for the axle, thus greatly reducing the friction at this point and the consequent wear on these parts of a drill. Bolted to the frame A at each side of the machine are brackets S, which have an integrally-formed hood-shaped extension S' at right angles to the bracket open at the bottom, into which opening the flange T on the circular journal or hanger T' extends, where it is secured and held by bolt 15, which passes through the sides of the hood and the flange T. The axle A" passes through the journal or housing, which is provided with small steel rollers or balls which lie between the axle and the walls of the housing, thus producing roller or ball bearing surfaces for the axle. As one side of these journals T' comes against the hub of the carrying-wheels, I prefer to leave the adjacent side of the journal open, as seen in Fig. 19, and fit within a countersunk portion of the hub $t$, which thus securely closes that side of the journal.

In order to make the bearings dirt-proof or as nearly so as possible, I place washers $t'$, made of leather or any other suitable material, at the ends of the journal, between the rollers or balls and the walls of the housing.

The other part of my improvement relates to the manner of mounting the disks and the method of their attachment to the drag-bars, and I have shown several ways of mounting the disks, the following description being of the construction shown in Fig. 22: Riveted or otherwise secured to the disk V on the convex side thereof and around an opening in the disk is a flanged collar $v'$, the collar being of smaller circumference than the circumference of the opening in the disk through which the collar extends, leaving a space between the disk and the collar. Mounted on the concave side of the disk and encircling the collar V' is a box or housing $w$, which fits between the collar and the disk $v$. This housing $w$ has a trunnion $w'$, which extends into the collar and is made stepped to fit the conduit extension or support $x$, which is also stepped to correspond therewith. The trunnion $w'$ has an opening through its center for the passage of a bolt, the head of which fits in a countersunk portion of the box $w$, as clearly seen, while the other end is screw-threaded to take into a screw-threaded opening in the conduit-support $x$, whereby the conduit is supported in place, the bolt being fitted with a clamping-nut $x'$, which securely holds the parts in place. The trunnion $w'$ has steel washers or cones $y$ $y$ encircling it, which cones form a ball-race for small steel or metal balls and retain the balls in place, keeping them in contact with the collar and the housing at one end and the collar and conduit-support at the other, thus forming ball-bearings for the disk and its connections, thereby reducing the friction to a minimum.

In Fig. 23 I have shown a modified construction, in which the circumference of the collar $v'$ is smaller and the washers or ball-bearing cones $y$ $y$ are placed over the collar and come between this collar and the housing $w$, thus retaining the balls between the collar and the housing. When this form of housing $w$ is used, the drag-bars may be clamped around this housing in the following manner: The drag-bars are riveted together at a point a sufficient distance from their lower ends to permit of their being given a quarter-twist, so as to bring the broad surfaces of the drag-bars in a horizontal position the one above the other. The housing $w$ is placed between the horizontal ends of the drag-bars, which are bolted together on each side of the housing, as seen at $z$ $z$, Fig. 21, thus securely fastening or clamping the disk between the drag-bars; or in place of having both drag-bars or irons extend the entire length only one may be made the required length and given a quarter-twist, as before described, and a plate of sufficient length bolted to the drag-bar in the manner as above described.

With my construction of drill it will thus be seen that a much lighter and easier operating drill is obtained and one which is more conveniently operated, greatly reducing the strain on the operator.

Having thus described my invention, what I claim, and desire to secure by Letters Patent, is—

1. In a seeding-machine, the lifting device consisting of a lever with arms, one of which has pivotal connection, with a rod whose free end is supported by a collar, a balance-spring supported by said rod and normally in line with the fulcrum of said lever, and mechanism intermediate the rocker-shaft and the other arm of said lever, substantially as and for the purpose described.

2. In a seeding-machine, the combination of the lifting device consisting of a lever with arms, a balance-spring bearing on one of said arms and normally in line with the fulcrum of said lever, and mechanism intermediate the rocker-shaft and the other arm of said lever, with rocker-head mounted on said rocker-shaft which takes beneath the loosely-hung drag-bars whereby they are lifted, substantially as shown and described.

3. In a seeding-machine, drag-bars loosely hung on a rocker-shaft, in combination with a drag-bar head securely fastened to the rocker-shaft between the drag-bars, said drag-bar head arranged to engage with the drag-bars, a spacing-block placed between the drag-bars and attached thereto, of a pressure-spring attached to said drag-bar head and engaging with the spacing-block, substantially as and for the purpose described.

4. In a seeding-machine, loosely-mounted drag-bars, a rocker-shaft with rocker-head mounted thereon, pressure-spring secured to said rocker-head and acting on the drag-bars, with spacing-block for attaching said springs to the drag-bars, substantially as and for the purpose described.

5. In a seeding-machine, loosely-mounted drag-bars, a drag-bar head mounted on a rocker-shaft, said drag-bar head having wings to engage with the drag-bars, with pressure-spring attached to said drag-bar head, and a spacing-block placed between the drag-bars and secured thereto, the free end of said pressure-spring acting on said spacing-block, substantially as and for the purpose described.

6. In a seeding-machine, loosely-mounted drag-bars, a drag-bar head securely attached to the rocker-shaft, said drag-bar head having wings to engage with the drag-bars whereby they may be lifted by rocking the rocker-shaft, in combination with a pressure-spring attached to said drag-bar head, and a spacing-block placed between the drag-bars and secured thereto, said spacing-block provided with a slot to receive the free end of the pressure-spring, substantially as and for the purpose described.

7. In a seeding-machine, loosely-mounted drag-bars, a rocker-shaft with rocker-head mounted thereon, a pressure-spring secured to said rocker-head, and spacing-block secured between said drag-bars, said spacing-block having constant contact with the pressure-spring, whereby the drag-bars are put under pressure, or lifted, substantially as and in the manner described.

8. In a seeding-machine, the furrow-openers consisting of concavo-convex disks having a central opening and a flanged collar secured about said opening, the collar extending through said opening, in combination with housing on the concave side of the disks, said housing having a trunnion which passes into said sleeve, of retaining-cones fitted on said trunnion, to retain metallic balls, substantially as and for the purpose described.

9. In a seeding-machine, the furrow-openers consisting of concavo-convex disks having a central opening, and a flanged collar secured about said opening, said collar extending through said opening, in combination with housing on the concave side of the disks, said housing having a trunnion which passes into said collar, and retaining-washers fitted on said sleeve between the walls of the housing and the collar to retain metallic balls, substantially as and in the manner specified.

10. In a seeding-machine the furrow-openers consisting of concavo-convex disks, having a central opening a sleeved collar secured about said opening on the convex side, and extending through said opening, in combination with housing on the concave side of the disks, said housing having a stepped trunnion which passes into said sleeve and engages with the conduit-support, of retaining-washers, to retain and hold metallic balls in contact with the movable parts of said furrow-openers, substantially as and for the purpose described.

11. In a seeding-machine, the main axle of which is supported in a journal having roller-bearings, said journal secured to the main frame by a bracket, in combination with sprocket-clutch mechanism on said main axle, of toothed collars having contact with said clutch mechanism, and means for throwing said collars out of mesh and disengaging the clutch mechanism, substantially as shown and described.

12. In a seeding-machine, the axle of which has a sprocket-clutch mechanism whereby motion is communicated to the seeding devices, in combination with disengaging-collars fitting around said clutch mechanism, of a rocker-shaft and means connecting the rocker-shaft with the disengaging-collars, substantially as and for the purpose described.

13. In a seeding-machine, the combination of a sprocket-clutch mechanism whereby motion is communicated to the seeding devices, said clutch mechanism having controlling contact with disengaging-collars, one of said collars stationarily attached to the frame, with a pivoted lever connected to the other or loose collar whereby the clutch mechanism may be disengaged, substantially as and in the manner described.

14. In a seeding-machine, the combination with a sprocket-clutch mechanism for communicating motion to the seeding devices, of toothed collars fitting over said clutch mechanism, one of said collars stationarily attached, of means to throw the toothed collars out of mesh and thereby disengaging the clutch mechanism, substantially as and for the purpose described.

15. In a seeding-machine, a sprocket-clutch mechanism for communicating motion to the seeding devices, toothed collars fitting around said clutch, one of said collars stationarily attached, the other having connection with the rocker-shaft, whereby the collars are wedged and the clutch disengaged, substantially as and for the purpose described.

16. In a seeding-machine a rock-shaft, an arm rigidly connected thereto, a spring-rod integral throughout its entire length, and pivotally connected to said arm, a spiral spring on said rod, a spring-stop rigidly attached to the frame or tongue of the machine, said stop having an enlarged opening adapted to receive the free end of the spring-rod and permit its free reciprocation when the shaft is rocked but compressing the spring until the centers of the rock-shaft, spring-rod and arm-pivot are in line with each other, the receding of said centers from said line acting as a release to the spring, substantially as and in the manner specified.

THOS. BRENNAN, Jr.

Witnesses:
JOHN TREITZ,
R. E. BRENNAN.